Jan. 13, 1959

F. S. LAPEYRE ET AL 2,868,014

SHRIMP METERING DEVICES

Filed Aug. 30, 1954

INVENTORS
F. S. LAPEYRE &
J. M. LAPEYRE
BY Wilkinson & McKinney
ATTORNEYS

Jan. 13, 1959   F. S. LAPEYRE ET AL   2,868,014
SHRIMP METERING DEVICES
Filed Aug. 30, 1954   3 Sheets-Sheet 2
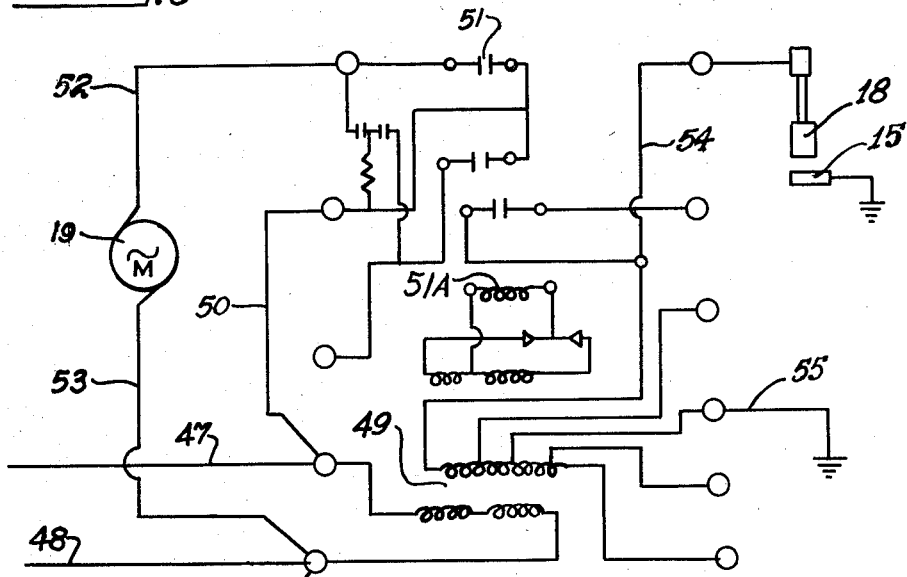
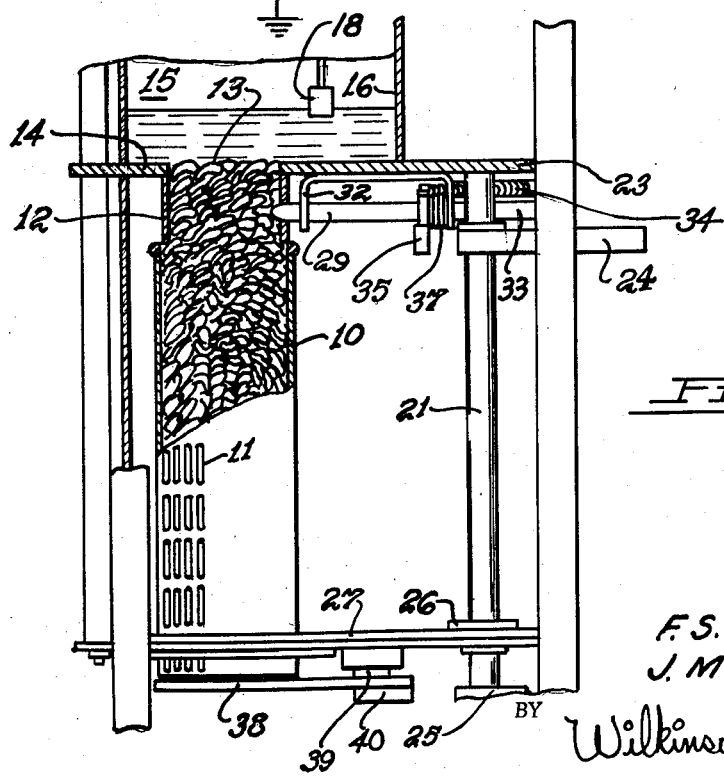
INVENTORS
F. S. LAPEYRE &
J. M. LAPEYRE
BY Wilkinson & Mawhinney
ATTORNEYS Jan. 13, 1959  F. S. LAPEYRE ET AL  2,868,014
SHRIMP METERING DEVICES Filed Aug. 30, 1954  3 Sheets-Sheet 3

INVENTORS
F. S. LAPEYRE &
J. M. LAPEYRE
BY Wilkinson Mawhinney
ATTORNEYS

United States Patent Office 2,868,014
Patented Jan. 13, 1959

2,868,014

SHRIMP METERING DEVICES

Fernand S. Lapeyre and James M. Lapeyre, New Orleans, La., assignors to The Peelers Company, Houma, La., a partnership Application August 30, 1954, Serial No. 452,957

11 Claims. (Cl. 73—223)

The present invention relates to shrimp metering devices and has for an object to provide a novel way of metering a predetermined quantity of shrimp passed through the device which may be placed in circuit with other shrimp processing equipment for determining the lease charge on the equipment based on the quantity of shrimp processed by the equipment; or which may be employed as a bulk dispenser of shrimp.

Another object of the present invention is to provide a metering device to take advantage of a particular physical characteristic of shrimp, namely the outer mucous membrane present on a freshly peeled shrimp which is not soluble in water and which when put under the pressure of the weight of matted shrimp will effect a water tight seal. Shrimp is conveyed through the various stages of processing equipment by water and such conveying medium together with the shrimp may be employed as a actuating device for a trapping mechanism for restraining and releasing predetermined quantities of the shrimp conveyed by the water when the predetermined quantity is had.

A further object of the present invention is to provide a metering device having a colander-like metering container which when employed with shrimp conveyed in a liquid will retain the shrimp and pass the liquid. The shrimp upon filling the container will matt at the filling end thereof causing the conveying liquid level to rise at the filling end of the metering container to actuate a device which will cause the shrimp within the container to be released.

A still further object of the present invention is to provide a foraminous-like metering container with filling and discharge gates to define a meter trap which is also provided with gate operating means to cycle the trapping of shrimp in a liquid conveying medium whereby upon the filling of the trap with shrimp the liquid level of the conveying medium will rise to actuate a circuit to operate the gates of the metering container in sequence to release only the metered quantity of shrimp.

Another object of the present invention is to provide a shrimp metering device with a novel form of filling gate for the metering container which must in operation penetrate a mass of shrimp without damaging the precious shrimp meats which gate is in the form of a plurality of parallel spaced prong-like members adapted to smoothly enter the interstices of the matted shrimp in the metering container. The prong-like members are provided with rounded slightly elongated nose-like leading ends.

With the foregoing and other objects in view, the invention will be more fully described hereinafter, and will be more particularly pointed out in the claims appended hereto.

In the drawings, wherein like symbols refer to like or corresponding parts throughout the several views:

Figure 2 is a fragmentary side elevational view of the upper section of Figure 1 in one of its operational conditions, having parts broken away and parts shown in section.

Figure 5 is a schematic wiring diagram of the probe circuit for energizing and driving the motor for operating the metering container filling and discharge gates.

Figure 1:
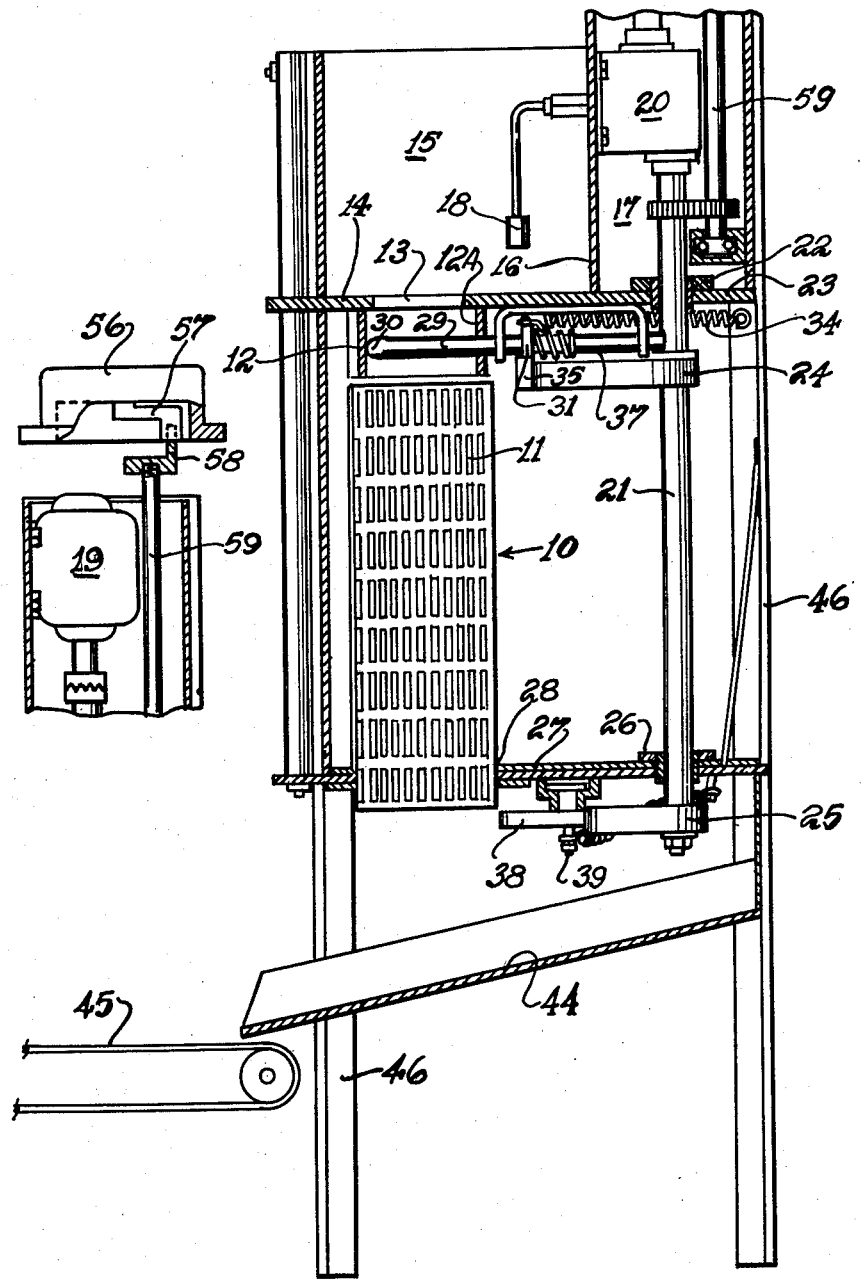
Figure 1 is a side elevational view, with parts broken away and parts shown in section of a shrimp metering device constructed in accordance with the present invention.
Figure 3:
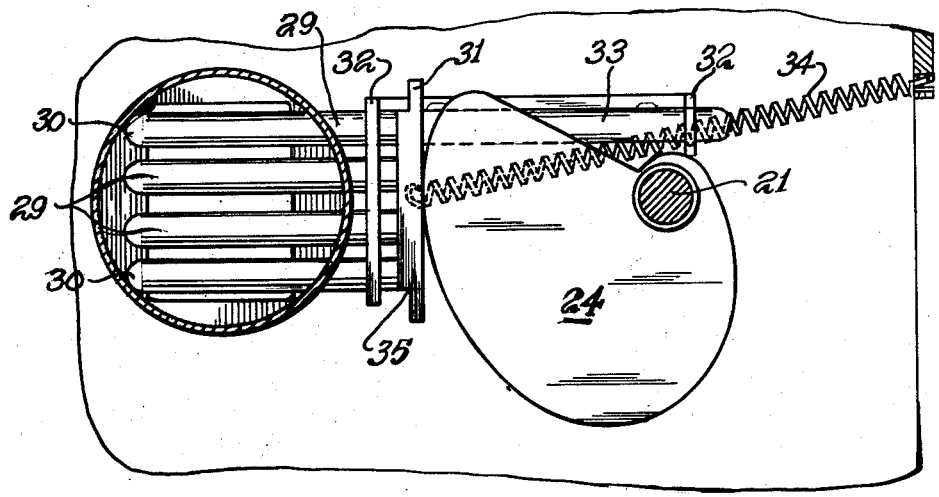
Figure 3 is a bottom elevation of the metering container filling gate and its operating mechanism.

Referring to Figure 1 of the drawings 10 designates a metering container of any suitable geometric form, cylindrical as shown, and which is constructed of a material having vertically elongated openings 11. The transverse width of the slots may be slightly less than the width of the smallest specie of shrimp to be metered. In fact the wall of the container 10 may be of foraminous like, colander-like or reticulated construction which will retain the shrimp being metered and assure that the conveying water is expelled from the container leaving only shrimp. The upper end of the container 10 is secured to a blank wall chute 12 in any suitable manner such as bolting, welding, etc. The upper end of the chute 12 is in communication with an opening 13 in the bottom 14 of a probe tank 15. One of the walls 16 of the probe tank 15 is higher than the others and defines with the front and rear wall of the tank 15 a motor cubicle 17. Secured to the side of the wall 16 closest the opening 13 is an electric probe 18 with its contact end removed from the bottom 14 of the probe tank 15.

Secured to the other side of wall 16 is an electric motor 19, which through suitable reduction gearing 20 drives an output shaft 21 journaled in a bushing 22 passing through the bottom 23 of the motor cubicle 17. Gate operating cams 24, 25 are secured on shaft 21 for rotation therewith. The lower end of shaft 21 is journaled in a bearing 26 carried by a spacer plate 27 which also receives and retains the lower end of the metering container 10, as by welding or the like at 28. The plate 27 also acts to maintain the metering container in proper axial alignment with the openings 13 and the chute 12.

Passing through openings in one wall 12A of the chute 12 are a plurality of substantially parallel spaced apart prong-like projections 29 having rounded noses 30. The projections are secured together as by a bar 31 for gang operation. Guides 32 secured to the bottom of the probe tank cooperate with a slide extension 33 carried by one of the projections 29 to maintain the proper horizontal alignment of the gang to define a slidable entrance gate to the metering container. Secured to the bar 31 and a projection beneath the motor cubicle 17 is a coil spring 34 for biasing the filling or upper gate to a normally opened condition, as shown in Figure 2.

Extending below the bar 31, and secured thereto cam plate 35 is positioned to be engaged by the cam 24 secured to shaft 21 for closing and permitting the opening of the filling gate above the metering container 10. A buffer spring 37 is provided on the slide extension 33 of the filling gate to cushion the impact of bar 31 against the rear guide 32 when the cam 24 permits the load of coil spring 34 to take over.

Figure 4:
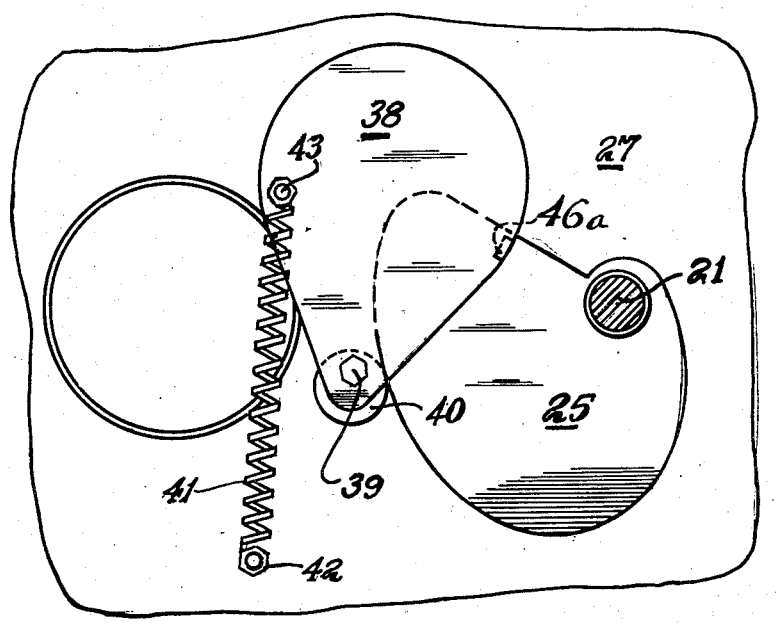
Figure 4 is a bottom elevation of the metering container discharge gate and its operating mechanism.

The discharge or dumping gate of the metering container may consist for example, as shown in Figure 4, of a plate 38 pivoted to the plate 27 by a bolt 39. Secured to the plate 38 is a cam projection 40 positioned to be engaged and actuated by the cam 25 secured to the lower end of shaft 21. A spring 41 is provided for biasing the discharge gate to a normally closed position and has one of its ends anchored to the plate 27 as at 42 and the other end anchored to the plate 38 at 43. A limit stop 46a is provided to keep the spring 41 from pulling the plate 38 beyond the lower opening of the metering container 10.

The cam surfaces are so shaped and the cams so positioned relatively on shaft 21 that one of the gates, either upper or lower will be closed at all times.

Positioned beneath the discharge or dumping end of the metering container 10 is a trough 44 for guiding the shrimp on to a conveyor 45 for delivery to the next processing station.

The probe tank, motor cubicle, chute and metering container may all be suitably mounted or assembled on an angle iron or other suitable frame 46.

56 designates a counting device for counting the number of times that the container 10 has been filled and discharged. The counter 56 has an actuator 57 which registers with a driver 58 screwed to the end of a shaft 59 which will rotate once for each revolution of the driven shaft 21, which rotates once for each cycle of filling and discharge of the container 10.

Referring particularly to Figure 5, the circuit of a form of device employed with the gate cam drive shaft is shown in which the motor 19 is driven from current supplied by lines 47, 48 which energize a transformer 49. The motor line circuit is completed through line 50, contacts 51, lines 52, 53 to return line 48. The actuation of contacts 51 is under the control of transformer taps 54, 55 which together with the probe 18 define the circuit for energizing the relay 51A to close contacts 51, when the conveying water completes the circuit between the probe 18 and tank 15. Upon closing of contact 51 the motor 19 is driven which through reduction gearing 20 drives output shaft 21 causing the cams 24, 25 to control the filling and discharging of the metering container 10.

The relay 51A is of the low voltage type as shown by the relatively few windings off the transformer 49 whereby a small voltage is placed across the points 18, 15 through the water in the reservoir to complete the circuit. This voltage is well below the line voltage necessary to drive the motor 19.

When the relay 51A is energized the motor circuit to motor 19 is closed and the motor begins to drive the cam shaft 21. One revolution of the cam shaft 21 discharges the shrimp trapped in the container 10 and releases the shrimp therefrom and all water in the tank 15. Without the conductance of the water between the probes, the relay circuit is de-energized causing the motor driving circuit to open. Thus, the motor 19 is stopped and the cycle of metering a container of shrimp is completed.

In operation shrimp are metered by the device by conveying the shrimp to the metering device shown in Figure 1 through the medium of water and introducing the shrimp and conveying water into the probe tank 15. The shrimp being heavier than the water will descend through the opening 13 in the bottom 14 of the probe tank 15 and the upper or filling gate consisting of the prong-like projections 29 will be in the open position as best seen in Figure 2. The discharge gate or plate 38 is in the closed position as shown in Figure 2. The mass of shrimp being conveyed therein will then fill the metering container 10, the conveying water draining from the container 10 by means of the vertically elongated slots 11 therein. This conveying water is spilled downwardly onto the trough 44 and emptied on to the conveyor 45 or on the floor.

When the container 10 is filled, the shrimp will form a matt or a block in the chute 12 and due to the mucous like membrane surrounding the outer surface of the freshly peeled shrimp the matted shrimp will form a fluid tight seal and the water level, that is conveying water, will rise in tank 15 to a predetermined point, governed by the positioning of the probe 18 in the tank. Upon attaining this position and the water contacting the probe an electrical circuit is energized and this circuit acts to energize the motor circuit which drives motor 19 through the reduction gearing 20 to drive the output shaft 21. Upon rotation of the output shaft 21 the cam 24 first engages the block 31 carried by the upper gate and urges the block 31 and its entrained prong-like projections 29 toward a closed position at which time the rounded noses 30 of the prong like projections pass through the interstices of the matted shrimp closing off the upper end of the metering container.

The cam 24 is so positioned with respect to the cam 25 that the cam 25 will not contact and operate the lower gate 38 until the upper gate is completely closed. Upon further rotation of the shaft 21 the cam 25 engages the cam projection 40 secured to the lower gate 38 which urges the lower gate 38 into an open position, as shown in Figures 1 and 4. At this time due to the smooth slick internal surface of the container 10 and, due to the potential position of mass of the shrimp entrapped in the container 10, such shrimp will drop or descend from the container 10 on to a trough 44 from whence they are dumped on to a conveyor 45 where they are introduced into additional processing procedures. The conveying water and back-log of shrimp are retained by the prong-like projections 29 which prohibits any additional amount of shrimp from falling through the container when the lower discharge gate 38 is open. Upon completion of the dumping operation the shaft 21 continues to rotate removing the cam 25 from contact with the plate 38 allowing this lower gate to close under the load of spring 34 to return this lower discharge gate to a closed position. The cam 24 also disengages the bar 31 which urged the prong-like projections 29 into blocking engagement across the chute 12. The spring 34 then takes over and retracts the prong like projections 29 to the open condition shown in Figure 2. The buffer spring 37 cushions the striking of the bar 31 against the guides 32.

The above describes one cycle of the metering operation giving the example of the metering of a single unit quantity of shrimp.

While an electrical circuit containing a probe 18 therein has been shown in this form of invention it is to be understood that any other device may be employed in connection with the tank 15 which would be responsive to the increase in height of water above a predetermined level, normal under ordinary operations of filling the container 10 which would act to energize the circuit of motor 19 for controlling the positioning of opening or closure of the upper and lower gate of the metering container 10.

While we have also shown the gates as being operated by cams 24, 25 it will be appreciated that such gates may be operated in any suitable manner under the control of a sequence of operations actuated by a rise in the water level in the tank 15.

While we have shown this invention applicable to shrimp as illustrated in the embodiment described it will be understood that the term "shrimp" in the claims will be equally applicable to any object having a slimy or mucous like outer surface capable of matting and forming a water tight seal which may be conveyed by a liquid medium.

Although we have disclosed herein the best form of the invention known to us at this time, we reserve the right to all such modifications and changes as may come within the scope of the following claims.

What we claim is:

1. A shrimp metering device comprising a shrimp and water receiving tank, a foraminous metering container, a blocking chute communicating said metering container with said tank for passing the shrimp to be metered from said receiving tank to said container, trapping means at the top and bottom of said metering container to trap a metered quantity of shrimp therein, and release means connected to said trapping means and control means for said release means arranged in said tank to actuate said trapping means to release a metered quantity of shrimp from said container when said container has been filled with shrimp and excess shrimp matt in said blocking chute forming a fluid seal causing the water to rise in said tank to a predetermined level at which time said release means are actuated.

2. A shrimp metering device comprising a foraminous metering container adapted to receive shrimp conveyed thereto by water, a probe tank, a blocking chute in communication with said probe tank and the filling end of said metering container, trapping means at the top and bottom of said metering container, release means for actuating said trapping means, electrical means for operating said release means, a probe in said probe tank and in circuit with said electrical means to cause actuation of said release means upon shrimp filling said metering container and matting in said blocking chute causing the conveying water to rise in said probe tank contacting said probe and completing the electrical circuit to said electrical means which actuates said release means to release a metered quantity of shrimp.

3. A shrimp metering device comprising a foraminous metering container, a source of shrimp and conveying water in communication with the filling end of said container, trapping means positioned above and below said metering container for trapping a metered quantity of shrimp therein, release means connected to actuate said trapping means and positioned to be actuated by the conveying water upon said conveying water reaching a predetermined head whereby said release means is actuated when said container has become filled with shrimp and the shrimp have matted above said container forming a water tight seal causing the conveying water level at said source to rise to a predetermined level and actuate said release means.

4. A shrimp metering device comprising a foraminous metering container, adapted to receive shrimp conveyed thereto by water, a probe container, a blocking chute in communication with said probe container and the filling end of said metering container for passing the shrimp and water from said probe container to said metering container, filling and discharge gates at opposite ends of said metering container, means biasing said filling gate normally open, means biasing said discharge gate normally closed, gate operating means to reverse the closure position of said gates, electrical means for operating said gate operating means, a probe in circuit with said electrical means and being positioned in said probe container to energize said electrical means when the metering container is filled with shrimp and said shrimp matt together in said blocking chute to form a water seal causing the water to rise in said probe container completing the electrical circuit to operate said gate operating means to dispense a metered quantity of shrimp.

5. A shrimp metering device comprising a foraminous metering container adapted to receive shrimp therein conveyed thereto by water, a probe container positioned to feed said metering container, upper and lower closure members for defining the metering chamber of said container, means for biasing said upper closure member to a normally open position, means for biasing said lower closure member to a normally closed position and reversal means including a control device in said probe container for closing said upper closure member and opening said lower closure member when said metering container has been filled with shrimp and said probe container filled with conveying water whereby a metered quantity of shrimp is discharged from said metering container.

6. A shrimp metering device comprising a reservoir adapted to receive shrimp and water, a foraminous container in communication with said reservoir, upper and lower container closure means positioned above and below said container, cam means positioned to operate said closure means to maintain one of said closure means closed when the other of said closure means is opened, an electric motor positioned to drive said cam means, and a probe in circuit with said electric motor positioned in said reservoir to energize said motor and drive said cam closure means to close said upper container closure means and upon completion of the closure of said upper closure member to open said lower container closure member, said motor being energized only when the height of water in said reservoir reaches said probe closing the motor circuit.

7. A shrimp metering device comprising a shrimp and water reservoir, a foraminous metering container positioned to receive shrimp and water from said reservoir but to retain only shrimp, a lower closure member positioned beneath said container at the end of said container opposite from its filling end, an upper pronged-like closure member positioned above the filling end of said container, said lower closure member being closed and the upper closure member being open during the filling of said metering container, and closure member actuating means a component of which is positioned in said reservoir relative to said upper and lower closure members whereby upon the water level in said reservoir attaining a predetermined height and actuating the component in said reservoir causing said upper closure member to close and said lower closure member to open discharging a metered quantity of shrimp from said container.

8. A shrimp metering device comprising a container, means for supplying water conveyed shrimp to said container through one end thereof, said container being foraminous to permit the escape of the conveying water therefrom but the retaining of the shrimp therein, trapping means at each end of the container, the trap at the end of the container remote from its inlet end being closed when the other trap is open for trapping shrimp in the container until the shrimp matt across the inlet end of the container to stop the flow of the conveyor water and cause the water to accumulate on the matted shrimp to a predetermined level in said water and shrimp supplying means, and trap operating means actuated by the conveying water when it reaches said predetermined level and connected to said trapping means to actuate said traps for reversing the relative positions of the traps.

9. A shrimp metering device comprising a shrimp and water receiving reservoir, water height detecting means in said reservoir, a foraminous metering container in communication with said reservoir, upper and lower traps operatively associated with said container, the lower of said traps being closed and the upper of said traps being open during the filling of the metering container, and trap actuating means connected to actuate said upper and lower traps to cause said traps to reverse their condition of opening, and control means for said trap actuating means connected therewith and with said water height sensitive detecting means in said reservoir to actuate said trap actuating means, when the height of water in said container actuates said water height detecting means.

10. For use with shrimp processing equipment, a metering device comprising a foraminous container adapted to be positioned in the line of water conveyed flow of shrimp through the equipment having a filling end and a discharge end, means for supplying water conveyed shrimp through said filling end, first gate means operatively connected with the filling end of said container, second gate means operatively connected with the discharge end of the container, gate actuating means operatively connected to said gate means for closing the first gate means while opening the second gate means when the container is filled with shrimp and the shrimp matt across the filling end of the container to prevent the flow of the conveying water into the container to cause a rise of the conveying water upstream of the container within said supplying means to at least a predetermined level, and means controlling said gate actuating means and positioned at a point where said last-named means will be actuated by the conveying water when it has reached its predetermined level within said supplying means.

11. A shrimp metering device comprising a shrimp and water receiving reservoir, a foraminous metering container positioned to receive shrimp conveyed to it by water from said reservoir and to retain only the shrimp releasing the water from said container, trapping means at each end of said container for trapping a metered quantity of shrimp therein, means for actuating said trapping means, and sensing means operatively connected with said actuating means and said reservoir for energizing said actuating means when the mass of shrimp in said container fills the container and mats forming a water seal causing the water to rise above the shrimp in said container to actuate said sensing means, energizing said sensing means and said actuating means and releasing the trapped contents of the metering container.

References Cited in the file of this patent

UNITED STATES PATENTS

| | | |
|---|---|---|
| 1,855,904 | Brown et al. | Apr. 26, 1932 |
| 2,045,813 | Waterbury | June 30, 1936 |
| 2,335,364 | Slaubaugh | Nov. 30, 1943 |
| 2,644,587 | Webster | July 7, 1953 |

FOREIGN PATENTS

| | | |
|---|---|---|
| 663,017 | France | Mar. 29, 1929 |
| 582,155 | Great Britain | Nov. 6, 1946 |